US006643148B1

(12) United States Patent
Smyth

(10) Patent No.: US 6,643,148 B1
(45) Date of Patent: Nov. 4, 2003

(54) AUDIO BAND CONDUCTED EMISSIONS SUPPRESSION ON POWER FEEDERS

(75) Inventor: David Bruce Smyth, Kanata (CA)

(73) Assignee: Alcatel Canada Inc., Kanata (CA)

( * ) Notice: Subject to any disclaimer, the term of this patent is extended or adjusted under 35 U.S.C. 154(b) by 0 days.

(21) Appl. No.: 10/124,405

(22) Filed: Apr. 18, 2002

(51) Int. Cl.[7] .............................................. H02M 3/335
(52) U.S. Cl. ...................................... 363/21.01; 363/20
(58) Field of Search ............................. 363/21.01, 20, 363/21.04, 21.12, 97

(56) References Cited

U.S. PATENT DOCUMENTS 4,866,367 A * 9/1989 Ridley et al. ............... 323/287
5,959,853 A * 9/1999 Kos ............................. 363/59
6,009,000 A * 12/1999 Siri ........................ 363/21.09
6,236,578 B1 * 5/2001 Chen ..................... 363/21.01

* cited by examiner

*Primary Examiner*—Bao Q. Vu
(74) *Attorney, Agent, or Firm*—Jim Zegeer

(57) ABSTRACT

A switch-mode power converter that powers the fan or blower unit in a communication system is used to suppress the audio band noise, thereby eliminating any need for additional passive or active filters used in the prior art. The frequency response of a switch-mode DC/DC converter is set by a control loop. By modifying the feedback amplifier compensation network in the control loop such that the frequency control loop bandwidth of the converter is substantially less than the AC load of the fans or blowers, the invention eliminates the need for additional filtering beyond that inherent in the power converter.

10 Claims, 3 Drawing Sheets

AUDIO BAND CONDUCTED EMISSIONS SUPPRESSION ON POWER FEEDERS

BACKGROUND AND BRIEF DESCRIPTION OF THE INVENTION

Standards ETSI ETS 300 132-2 and ANSI T1.315 specify an allowable amount of audio band emissions (up to 20 kHz) that may be conducted from a telecom shelf onto DC power feeders supplying the shelf. Typically, the main source of these audio band conducted emissions is the forced air cooling system, which comprises fans or blowers drawing a current pulsed at less than 1 kHz. The invention suppresses the audio band conducted emissions resulting from the pulsed current sufficiently to comply with the stated standards.

FIGS. 1 and 2 show two prior art approaches of limiting audio band emissions conducted onto DC power feeders supplying a telecom shelf. In the first approach, shown in FIG. 1, a large passive L-C filter 10 is placed between the power feeder connection point on the shelf and a high bandwidth DC-DC converter 11 that supplies the fans or blowers 12 of the shelf's cooling system. The passive filter limits the amount of audio band emissions that are conducted from the DC-DC converter 11 back onto the DC power feeders. In the second approach, shown in FIG. 2, a low bandwidth active filter 14 is placed between the high bandwidth DC-DC converter 13 and the fans or blowers 15. In this case the low bandwidth active filter limits the audio band emissions conducted through the DC-DC 13 converter onto the DC power feeders. In both approaches, the audio band emissions caused by the pulsed current used to drive the fans or blowers are sufficiently reduced before they are conducted back onto the DC power feeders, thereby enabling the telecom shelf to meet the aforementioned standards.

Regarding the first prior art approach, shown in FIG. 1, the main problem with this approach is that the physical size of the components required for the passive filter 10 is large, and therefore they occupy more than a desirable amount of shelf space, which is usually at a premium.

Regarding the second prior art approach, shown in FIG. 2, although the active filter 14 occupies less space than the passive filter 10 of FIG. 1, the approach still requires an amount of shelf space that could be further reduced. Additionally, a more complex thermal management solution is typically required due to resultant heating of a series pass element in the active filter.

Both approaches share a problem that is inherent to the high bandwidth DC-DC converters commonly used to regulate the DC voltage applied to the fan or blowers.

Typically, these converters are switch-mode power converters, which have an analog frequency control loop.

The frequency response of this control loop is set by the inherent characteristics of the power converter output filter and switch modulator, as well as the compensation network applied to the feedback error amplifier. In a power converter, it is very common to set the control loop bandwidth to a point well above the pulsed current frequency drawn by the fan or blower. In so doing, the power converter will react to any in band AC load applied to its output, thereby reflecting the AC current signature to its input and onto the power feeders for the shelf. Consequently, additional filtering is required to suppress the audio band noise reflected onto the power feeders.

BRIEF DESCRIPTION OF THE PRESENT INVENTION

The present invention solves the above discussed problem by providing a switch-mode direct current-to-direct current power converter and method for supplying power from a direct current power feed to a forced air cooling system of a communication system, the forced air cooling system unit having an air forcing unit. The fans/blowers units require a DC power source only. Internal to the fan/blower unit is a motor drive circuit that derives from the DC source an AC voltage necessary to drive the fan/blower. The resulting load current signature from the fan/blower drawn from the DC source is an AC waveform with a DC offset. The power converter includes an input adapted to couple to the direct current power feed and an output adapted to electrically drive the air forcing element. In a preferred embodiment, an analog frequency control loop controls the amount of the direct current provided to the air forcing element, the control loop having a response bandwidth which is lower in frequency than that of the alternating current drawn from the output by the air forcing element. Preferably, the analog frequency control loop comprises a compensation network for providing the response bandwidth. Furthermore, the frequency of the alternating current is preferably below 1 kHz and a capacitor is coupled to the output.

BRIEF DESCRIPTION OF THE DRAWINGS

The above and other objects, advantages and features of the invention will become more apparent when considered with the following specification and accompanying drawings wherein.

DETAILED DESCRIPTION OF THE INVENTION

Figure 1:
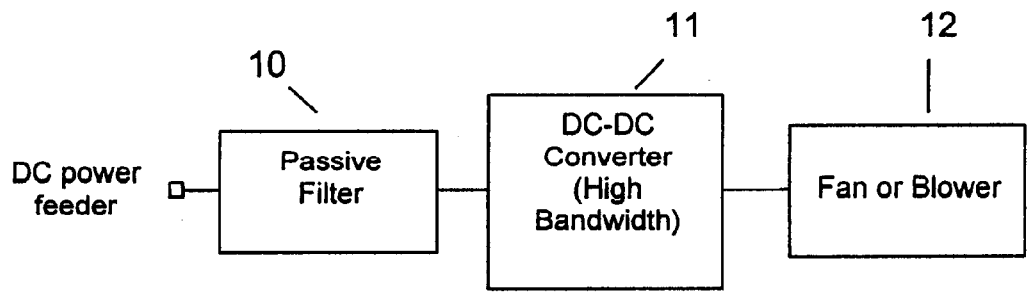
FIG. 1 is block diagram of a prior art power supply system for audio band conducted emission suppression.
Figure 2:
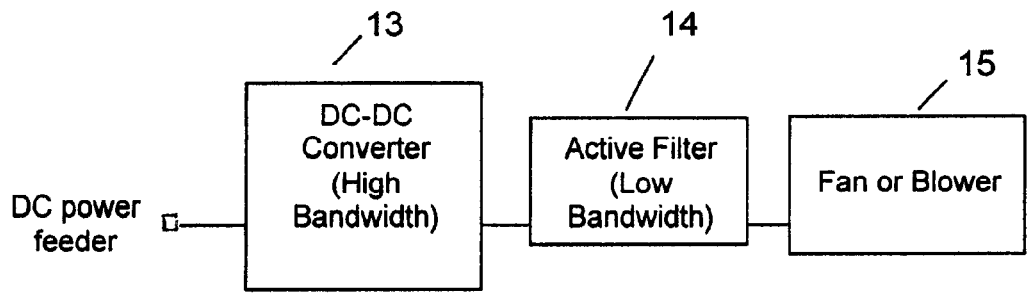
FIG. 2 is a further prior art approach to limiting audio band emissions onto DC power feeders supplying a telecom shelf.
Figure 3:
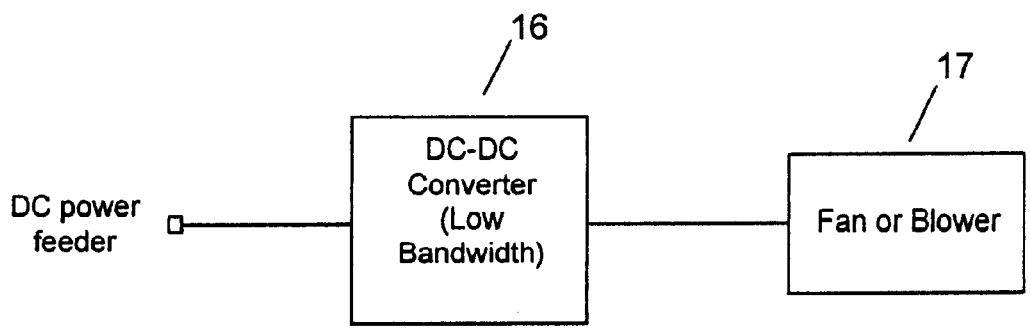
FIG. 3 is a block diagram of an audio band conducted emission suppression power feeder incorporating the invention.

Referring to FIG. 3, according to the present solution the inherent filter, within the switch-mode power converter 16 that powers the fan or blower unit 17, is used to suppress the audio band noise, thereby eliminating any need for additional passive or active filters used in the prior art. Since this lower bandwidth power converter requires a similar (or same) number of components to implement as the wider bandwidth power converter used in the prior art approaches, it occupies substantially the same physical space. Consequently, not needing additional filtering, the invention uses fewer components than the prior art approaches, and therefore uses less shelf space and dissipates less heat.

Figure 4:
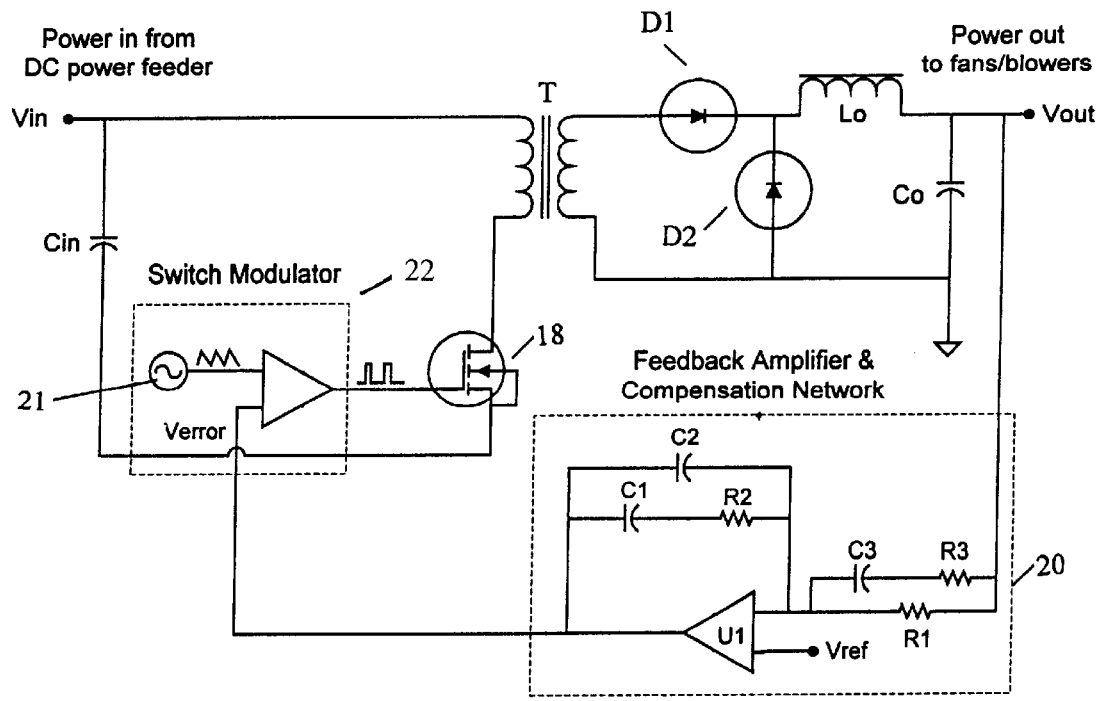
FIG. 4 is a further and more detailed block diagram of a DC/DC switch-mode power converter incorporating the audio band conducted emission suppressor incorporating the invention.
Figure 5:
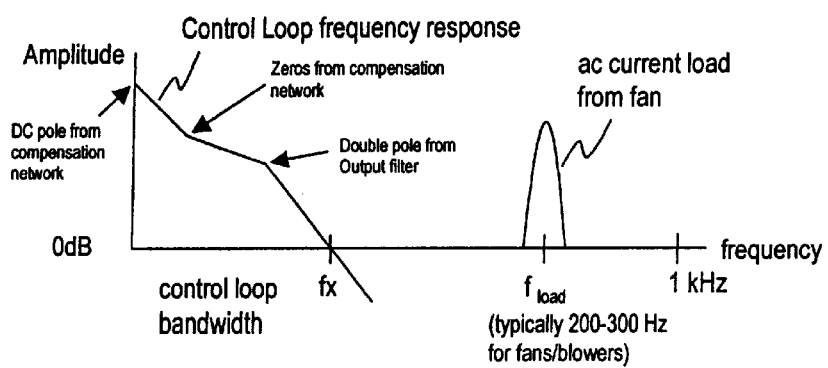
FIG. 5 is a graph of amplitude versus frequency showing the frequency response of the control loop in a preferred embodiment of the invention.

FIGS. 4 and 5 show the switch-mode DC-DC converter of FIG. 3 in more detail and the frequency response of its control loop, respectively. By modifying the feedback amplifier compensation network 20 such that the frequency control loop bandwidth of the power converter is substantially less than the AC load of the fans or blowers, the invention eliminates the need for additional filtering beyond that inherent in the power converter 16. This is because the frequency of the AC current drawn by the fans or blowers 17 is beyond the bandwidth of the power converter 16, and consequently the converter 16 will not react to changes in the AC current load. Since the converter 16 takes no action, it will continue to provide only the DC portion of the fan or blower current required, hence the current drawn from the shelf power feeders will be DC and the audio band AC noise will be eliminated.

Figure 6:
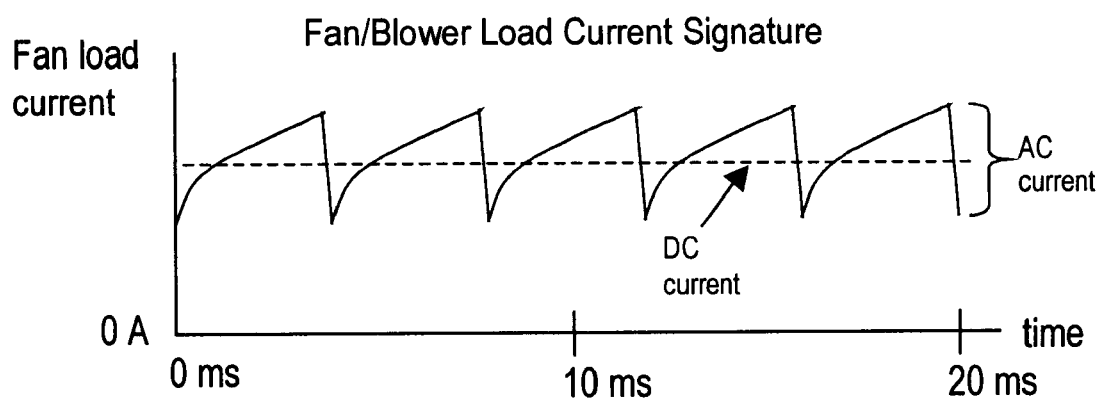
FIG. 6 is a graph of fan load current versus time showing the fan/blower load current signature.

The fans/blowers units 17 commonly used in telecommunication systems and applicable to this invention are DC powered only. In other words, the fans/blowers 17 require a DC power source only. Internal to the fan/blower is a motor drive circuit (not shown) that derives from the DC source, the required AC voltage necessary to drive the fan/blower. The resulting load current signature from the fan/blower drawn from the DC source is an AC waveform with a DC offset as shown in FIG. 6.

Referring to FIG. 4, the basic circuit operation is as follows: The power converter output voltage Vout is monitored by the feedback amplifier U1, and compared to a fixed voltage reference Vref. If a voltage fluctuation occurs at Vout at a speed within the frequency response of the amplifier compensation network (comprised of C1, C2, C3, R1, R2, R3 for the example of FIG. 4), a change in error voltage (Verror) will occur. Verror is compared in switch modulator 22 to a saw tooth waveform derived from an oscillator 21 within the switch modulator 22. The level of Verror controls the pulse width driving the main switch 18 in the switching power converter, which in turn controls the value of Vout. The AC voltage on the secondary winding or transformer T is rectified by diode D1 and D2 and filtered by inductor Lo and capacitor Co. Therefore, Verror is used to control the value of Vout based on the value of Vref, for Vout deviations falling within the control loop bandwidth.

Modification of the feedback amplifier to achieve the desired frequency response is done by setting the location of the poles and zeros in the frequency control loop transfer function. Referring to FIG. 4 as an example using a Type 3 compensation network 20, the inherent double pole of the power converter output filter requiring compensation is set by Lo and Co. The compensation network around U1 provides three poles (fp1=f(R1,C1,C2), fp2=f(R3,C3), fp3=f(R2,C1,C2)), and two zeros (fz1=f(R2,C1), fz2=f(R1,R3,C3)). By appropriate selection of C1, C2, C3, R1, R2 and R3, the power converter frequency control loop bandwidth can be set such that the open loop gain is less than 1 (or less than 0 dB), for frequencies equal to or greater than the AC component of the load current drawn by the fan or blower. This is illustrated in FIG. 5 showing the open loop bandwidth of fx, and a gain of less than 0 dB at the fan/blower AC load frequency. The power converter will have minimal to no reaction to changes in load at frequencies where its open loop gain is less than 0 dB, hence the power converter filters out AC fan/blower current leaving only the DC current present on the shelf power feeders.

The reduced frequency control loop bandwidth will result in poorer response to dynamic loads. However, this is not a concern when the load is a fan or blower. The AC current required by the fans or blowers will be supplied by the capacitance between the power converter output and the fan or blower, which in some cases may require a higher capacitance, lower ESR capacitor than would otherwise be the case.

Advantages of the invention in general and over the closest prior art solution include the following:
1. Physically smaller solution.
2. Less component count.
3. Reduced power consumption.

This invention has wide applicability to any telecom/datacom shelf requiring compliance ETSI ETS 300 132-2, or ANSI T1.315.

While the invention has been described in relation to preferred embodiments of the invention, it will be appreciated that other embodiments, adaptations and modifications of the invention will be apparent to those skilled in the art.

What is claimed is:

1. A method of controlling a switch-mode direct current to direct current converter for supplying power from a direct current power feed to a forced air cooling system of a communication system, said forced air cooling system having an air forcing unit requiring electrical current comprising both direct and alternating current components, said method comprising controlling the bandwidth of said switch-mode direct current to direct current power converter so that the responsive bandwidth is lower in frequency than that of the alternating current drawn from the output for driving said air forcing unit.

2. The method defined in claim 1 wherein said converter is provided with an analog frequency control loop having a reference amplifier and the step of controlling said bandwidth includes controlling a reference voltage to said reference amplifier.

3. A method of supplying power from a direct current power feed to a telecommunications cooling system requiring both direct current (DC) and alternating current (AC), said method comprising the steps of:
  providing a source of DC power,
  providing a DC/DC switch-mode converter for converting DC power from said source to an output having an AC current component riding on a DC current component, said DC/DC switch-mode converter having a control loop including a compensation network and a reference amplifier, a source of reference voltage coupled to said reference amplifier, and
  setting the control loop bandwidth to a selected dB level.

4. The method defined in claim 3 wherein the open loop gain is less than 0 dB and the AC current to said load is below 1 kHz.

5. A switch-mode direct current-to-direct current power converter for supplying power from a direct current power feed to a forced air cooling system of a communication system, the forced air cooling system having an air forcing unit requiring electrical power comprising both direct current and alternating current, the power converter comprising:
  an input adapted to couple to said direct current power feed;
  an output adapted to electrically drive said air forcing unit; and
  an analog frequency control loop for controlling an amount of the direct current provided to the air forcing unit, the control loop having a response bandwidth lower in frequency than that of the alternating current drawn from the output by said air forcing element.

6. The switch-mode direct current-to-direct current power converter defined in claim 5, wherein said analog frequency control loop comprises a compensation network for providing the response bandwidth.

7. The switch-mode direct current-to-direct current power converter defined in claim 6 wherein said compensation network circuit provides three poles and two zeros.

8. The switch-mode direct current-to-direct current power converter defined in claim 5, wherein said frequency control loop includes a feedback amplifier and a reference voltage source connected to said feedback amplifier.

9. The switch-mode direct current-to-direct current power converter defined in claim 5, wherein the frequency of the alternating current is below 1 kHz.

10. The switch-mode direct current-to-direct current power converter defined in claim 5, wherein said power converter further includes a capacitor coupled to the output.

* * * * *